United States Patent
Reddy et al.

(10) Patent No.: US 10,158,603 B2
(45) Date of Patent: Dec. 18, 2018

(54) EFFICIENT STORAGE OF NETWORK DISCOVERY RANGES

(71) Applicant: American Megatrends, Inc., Norcross, GA (US)

(72) Inventors: Bakka Ravinder Reddy, Suwanee, GA (US); Divya Nettem, Suwanee, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 289 days.

(21) Appl. No.: 15/345,621

(22) Filed: Nov. 8, 2016

(65) Prior Publication Data
US 2018/0131666 A1  May 10, 2018

(51) Int. Cl.
| | |
|---|---|
| *G06F 15/173* | (2006.01) |
| *H04L 29/12* | (2006.01) |
| *G06F 17/30* | (2006.01) |

(52) U.S. Cl.
CPC .... *H04L 61/2007* (2013.01); *G06F 17/30377* (2013.01); *G06F 17/30477* (2013.01); *G06F 17/30569* (2013.01); *H04L 61/6068* (2013.01)

(58) Field of Classification Search
CPC ............ H04L 61/1552; H04L 61/2007; H04L 61/6068; H04L 61/6095; H04L 17/30377; H04L 17/30477; H04L 17/30569; H04L 41/12

USPC ........................................................ 709/245
See application file for complete search history.

(56) References Cited

U.S. PATENT DOCUMENTS

| | | | |
|---|---|---|---|
| 6,377,987 B1 * | 4/2002 | Kracht | H04L 41/0213 370/254 |
| 6,834,276 B1 * | 12/2004 | Jensen | G06F 17/30882 |
| 2015/0317217 A1 * | 11/2015 | Kurabayashi | G06F 9/00 714/4.11 |

* cited by examiner

*Primary Examiner* — Wing F Chan
*Assistant Examiner* — Joseph R Maniwang
(74) *Attorney, Agent, or Firm* — Locke Lord LLP; Tim Tingkang Xia, Esq.

(57) ABSTRACT

A system includes a computing device communicatively connectable with network devices via a network. The computing device has a processor and a storage device storing computer executable code. The code is configured to receive multiple addresses, each network device identifiable by one of the addresses; in response to receiving the addresses, generate at least one long integer pair, each long integer pair including a start long integer and an end long integer corresponding to a range of addresses, and store the at least one long integer pair in a data store; and perform a discovery operation by: retrieving the at least one long integer pair from the data store; for each long integer pair, converting the start and end long integers to a start and end addresses; and performing discovery of the network devices using the addresses between the start and end addresses.

20 Claims, 5 Drawing Sheets

EFFICIENT STORAGE OF NETWORK DISCOVERY RANGES

FIELD

The present disclosure relates generally to network device discovery technology, and more particularly to systems and methods for providing an efficient storage of network discovery ranges.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A network my include multiple devices, and normally each device is identified by a specific internet protocol (IP) address. When network device discovery is performed, a large number of IP addresses need to be screened, and repeating IP addresses from different batches of discovery requests may result in duplicate discovery on the same network device.

Therefore, an unaddressed need exists in the art to address the aforementioned deficiencies and inadequacies.

SUMMARY

Certain aspects of the present disclosure relate to a system including a computing device communicatively connectable with multiple network devices via a network. In certain embodiments, the computing device includes a processor and a storage device storing computer executable code. The computer executable code, when executed at the processor, is configured to:

receive, by the computing device, a plurality of first addresses, wherein each of the network devices is identifiable by one of the first addresses;

in response to receiving the first addresses,
generate at least one long integer pair based on the first addresses, wherein each of the at least one long integer pair comprises a start long integer and an end long integer corresponding to a range of addresses; and
store the at least one long integer pair in a data store; and
perform a discovery operation by:
retrieving the at least one long integer pair from the data store;
for each of the at least one long integer pair, converting the start long integer and the end long integer to a start address and an end address; and
performing discovery of the network devices using the addresses between the start address and the end address.

In certain embodiments, the computer executable code, when executed at the processor, is configured to generate the at least one long integer pair based on the first address by:
converting each of the first addresses to a corresponding first long integer;
identifying and removing inclusions and overlaps in the first long integers to generate a plurality of first non-redundant long integers; and
determining, from the first non-redundant long integers, the start long integer and the end long integer of each of the at least one long integer pair, wherein each of the first non-redundant long integers is between the start long integer and the end long integer of one of the at least one long integer pair.

In certain embodiments, the inclusions and overlaps are identified by structured query language (SQL) query. In certain embodiments, the conversion between the IP address and the long integer is implemented using functions from Java and/or PHP.

In certain embodiments, the computer executable code, when executed at the processor, is further configured to:
receive, by the computing device, at least one second address; and
in response to receiving the at least one second address,
update the at least one long integer pair based on the at least one second address, and
store the updated at least one long integer pair in the data store.

In certain embodiments, the computer executable code, when executed at the processor, is configured to update the at least one long integer pair based on the at least one second address by:
converting the at least one second address to at least one second long integer;
identifying and removing inclusions and overlaps in the first non-redundant long integers and the at least one second long integer to generate a plurality of second non-redundant long integers; and
updating, from the second non-redundant long integers, the at least one long integer pair, wherein each of the second non-redundant long integers is between the start long integer and the end long integer of one of the updated at least one long integer pair.

In certain embodiments, the first addresses includes an internet protocol address (IP address), a range of IP addresses, or a subnet mask of IP addresses.

In certain embodiments, the data store includes a discovery table for storing the start long integer and the end long integer of each of the at least one long integer pair. In certain embodiments, the data store further includes a device table recording information and status of the network devices being discovered in the discovery operation.

In certain embodiments, the discovery operation is performed periodically. In certain embodiments, the discovery operation is performed according to a command received by the computing device.

Certain aspects of the present disclosure relate to a method of discovering network devices. In certain embodiments, the method includes:
receiving, by a computing device, a plurality of first addresses, wherein the computing device comprises a processor and a storage device storing computer executable code, and communicatively connectable with the network devices via a network, and each of the network devices is identifiable by one of the first addresses;
in response to receiving the first addresses,
generating at least one long integer pair based on the first addresses,
wherein each of the at least one long integer pair comprises a start long integer
and an end long integer corresponding to a range of addresses; and
storing the at least one long integer in a data store; and
performing a discovery operation by:
retrieving the at least one long integer pair from the data store;

for each of the at least one long integer pair, converting the start long integer and the end long integer to a start address and an end address; and performing discovery of the network devices using the addresses between the start address and the end address.

In certain embodiments, the step of generating the at least one long integer pair based on the first addresses comprises:

converting each of the first addresses to a corresponding first long integer;

identifying and removing inclusions and overlaps in the first long integers to generate a plurality of first non-redundant long integers; and determining, from the first non-redundant long integers, the start long integer and the end long integer of each of the at least one long integer pair, wherein each of the first non-redundant long integers is between the start long integer and the end long integer of one of the at least one long integer pair.

In certain embodiments, the inclusions and overlaps are identified by structured query language (SQL) query.

In certain embodiments, the method further includes:

receiving, by the computing device, at least one second address; and in response to receiving the at least one second address, updating the at least one long integer pair based on the at least one second address, and store the updated at least one long integer pair in the data store.

In certain embodiments, the steps of updating the at least one long integer pair based on the at least one second address includes:

converting the at least one second address to at least one second long integer;

identifying and removing inclusions and overlaps in the first non-redundant long integers and the at least one second long integer to generate a plurality of second non-redundant long integers; and updating, from the second non-redundant long integers, the at least one long integer pair, wherein each of the second non-redundant long integers is between the start long integer and the end long integer of one of the updated at least one long integer pair.

In certain embodiments, the first addresses includes an internet protocol address (IP address), a range of IP addresses, or a subnet mask of IP addresses.

In certain embodiments, the data store includes a discovery table for storing the start long integer and the end long integer of each of the at least one long integer pair. In certain embodiments, the data store further includes a device table recording information and status of the network devices being discovered in the discovery operation.

In certain embodiments, the discovery operation is performed periodically. In certain embodiments, the discovery operation is performed according to a command received by the computing device.

Certain aspects of the present disclosure relate to a non-transitory computer readable medium storing computer executable code. In certain embodiments, the computer executable code, when executed at a processor of a computing device, is configured to:

receive a plurality of first addresses, wherein each of a plurality of network devices is identifiable by one of the first addresses and communicatively connectable with the computing device via a network;

in response to receiving the first addresses, generate at least one long integer pair based on the first addresses, wherein each of the at least one long integer pair comprises a start long integer and an end long integer corresponding to a range of addresses; and store the at least one long integer pair in a data store; and perform a discovery operation by:

retrieving the at least one long integer pair from the data store;

for each of the at least one long integer pair, converting the start long integer and the end long integer to a start address and an end address; and performing discovery of the network devices using the addresses between the start address and the end address.

In certain embodiments, the step of generate at least one long integer pair based on the first addresses comprises:

converting each of the first addresses to a corresponding first long integer;

identifying and removing inclusions and overlaps in the first long integers to generate a plurality of first non-redundant long integers; and determining, from the first non-redundant long integers, the start long integer and the end long integer of each of the at least one long integer pair, wherein each of the first non-redundant long integers is between the start long integer and the end long integer of one of the at least one long integer pair.

In certain embodiments, the inclusions and overlaps are identified by structured query language (SQL) query.

In certain embodiments, the computer executable code, when executed at a processor of a computing device, is further configured to:

receive at least one second address; and in response to receiving the at least one second address, update the at least one long integer pair based on the at least one second address, and store the updated at least one long integer pair in the data store.

In certain embodiments, the step of update the at least one long integer pair based on the at least one second address includes:

converting the at least one second address to at least one second long integer;

identifying and removing inclusions and overlaps in the first non-redundant long integers and the at least one second long integer to generate a plurality of second non-redundant long integers; and updating, from the second non-redundant long integers, the at least one long integer pair, wherein each of the second non-redundant long integers is between the start long integer and the end long integer of one of the updated at least one long integer pair.

In certain embodiments, the first addresses includes an internet protocol address (IP address), a range of IP addresses, or a subnet mask of IP addresses.

In certain embodiments, the data store includes a discovery table for storing the start long integer and the end long integer of each of the at least one long integer pair. In certain embodiments, the data store further includes a device table recording information and status of the network devices being discovered in the discovery operation.

In certain embodiments, the discovery operation is performed periodically. In certain embodiments, the discovery operation is performed according to a command received by the computing device.

In certain embodiments, the computer executable code includes: a discovery module, configured to receive first addresses, retrieve at least one long integer pair from the data store, perform discovery of the network devices using the addresses between a start address and an end address; a process module, configured to generate at least one long integer pair based on the received first address, convert start long integer and end long integer to a start address and an end address, update the at least one long integer pair based on the at least one second address, and store the updated at least one integer pair in the data store; and a data store, configured to store non-redundant long integers. The process module is further configured to generate at least one long integer pair based on the received address by: converting each of the first addresses to a corresponding first long integer; identifying and removing inclusions and overlaps in the first long integers to generate a plurality of first non-redundant long integers; and determining, from the first non-redundant long integers, the start long integer and the end long integer of each of the at least one long integer pair, wherein each of the first non-redundant long integers is between the start long integer and the end long integer of one of the at least one long integer pair.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
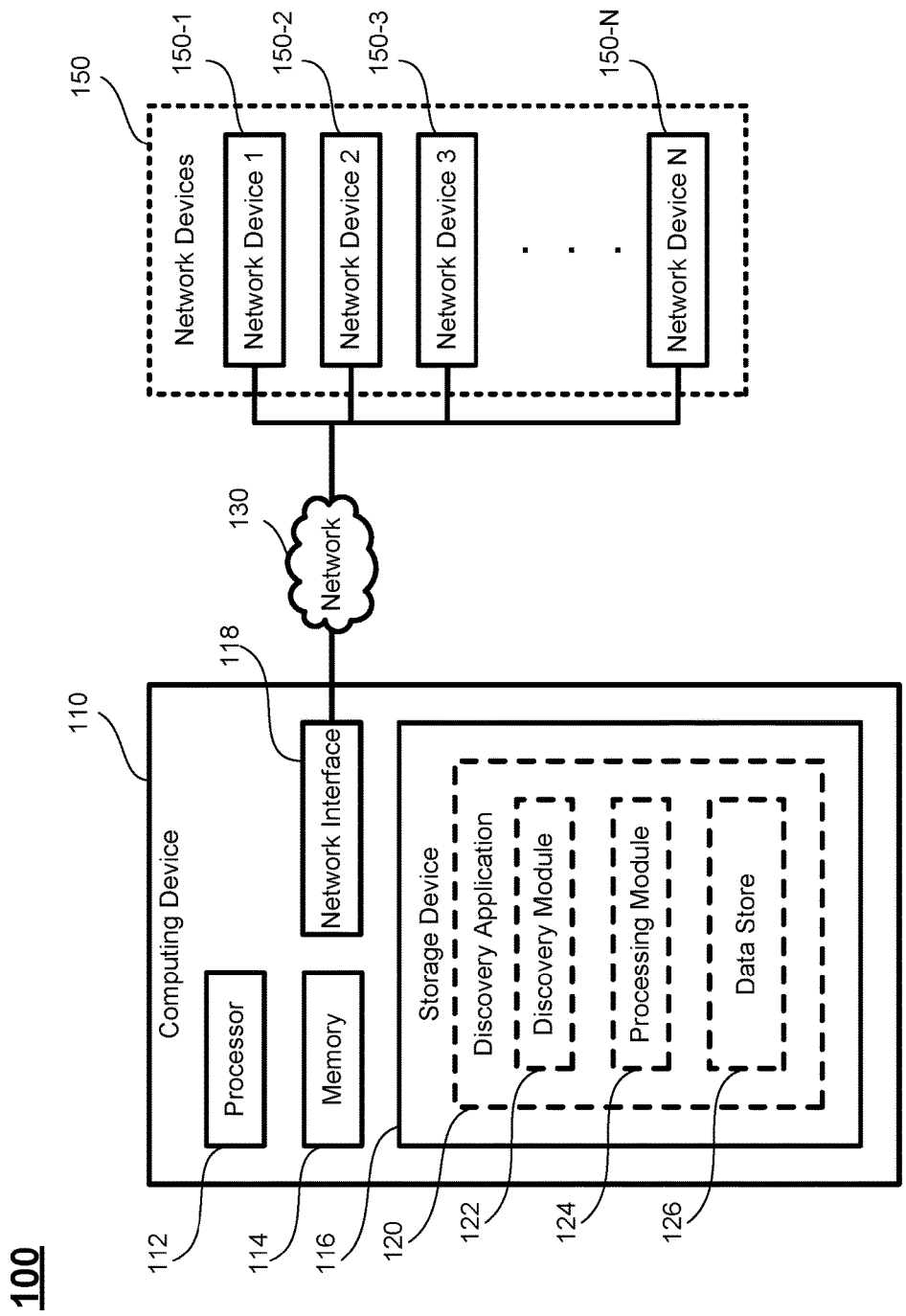
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The term "Structured Query Language" or its abbreviation "SQL", as used herein, generally refers to a special-purpose programming language designed for managing data held in a relational database management system (RDBMS), or for stream processing in a relational data stream management system (RDSMS).

The term "long integer", as used herein, generally refers to a data type which represents a finite subset of a mathematical integer. In certain embodiments, a long integer may be a 32-bit signed (i.e., positive or negative) or unsigned (all positive) mathematical number that does not include a decimal point. Signed long integers have a minimum value of $-2^{31}$ and a maximum value of $(2^{31}-1)$, and unsigned long integers have a minimum value of 0 and a maximum value of $(2^{32}-1)$.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In accordance with the purposes of present disclosure, as embodied and broadly described herein, in certain aspects, the present disclosure relates to a system having multiple network devices and a computing device in communication with the network devices via a network. FIG. 1 schematically depicts an exemplary system according to certain embodiments of the present disclosure. As shown in FIG. 1, a system 100 includes a computing device 110, multiple network devices 150, and a network 130 connecting the computing device 110 and the network devices 150. In certain embodiments, the network 130 may be a wired or wireless network, and may be of various forms. Examples of the network 130 may include, but is not limited to, a local area network (LAN), a wide area network (WAN) including the Internet, or any other type of networks. The best-known computer network is the Internet.

The computing device 110 is a computer device to perform a discovery operation for all the network devices 150 available within the network 130. In certain embodiments, the computing device 110 may be a general purpose computer, a specialized computer, a server, a headless computer, a mobile device such as a laptop computer, a smartphone or a tablet, a management controller, a system-on-chip (SOC), or any other types of computing device. As shown in FIG. 1, the computing device 110 may include, without being limited to, a processor 112, a memory 114, a storage device 116, and a network interface 118. In certain embodiments, the computing device 110 may include other hardware components and software components (not shown) to perform its corresponding tasks. Examples of these hardware and software components may include, but not limited to, other required memory, interfaces, buses, Input/Output (I/O) modules and peripheral devices.

The processor 112 is configured to control operation of the computing device 110. In certain embodiments, the processor 112 may be a central processing unit (CPU). The processor 112 can execute an operating system (OS) and/or other applications, such as a discovery application 120, of the computing device 110. In some embodiments, the computing device 100 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the computing device 110 may run on more than one memory 114.

The storage device 116 is a data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110.

The network interface 118 is the point of interconnection between the computing device 1110 and the network devices 150. The network interface 118 may be a network interface card (NIC), but does not have to have a physical form. Instead, the network interface 118 can be implemented in software. The network interface 118 may be a system's (software and/or hardware) interface between two pieces of equipment or protocol layers in a computer network. The network interface 118 may have some form of network address. This may consist of a node Id and a port number or may be a unique node Id in its own right. The network interfaces 118 provides standardized functions such as passing messages, connecting and disconnecting, etc.

Each of the network devices 150 is a physical device which is communicatively connectable to the computing device 110 through the network 130. In certain embodiments, each of the network devices 150 may be a computing device, a networking hardware, or network equipment that has communication and interaction functionalities with other devices on a computer network. As shown in FIG. 1, the network devices 150 include multiple devices of network device 1 to network device N with labels 150-1 to 150-N, where N is a positive integer. In certain embodiments, each of the network devices is identifiable by a network address, such as an IP address.

As shown in FIG. 1, one of the applications stored in the storage device 116 is a discovery application 120, which is an application configured to perform discovery operations for the network devices 150 within the network 130. The discovery application 120 includes computer executable code or instructions executable at the processor 132, and the computer executable code or instructions may include one or more software modules to collectively form the discovery application 120. In certain embodiments, the discovery application 120 may be part of the OS of the computing device 110. Alternatively, in certain embodiments, the discovery application 120 may be a standalone application.

As shown in FIG. 1, the discovery application 120 has a discovery module 122, a processing module 124, and a data store 126. It should be noted that all of the modules of the discovery application 120 are each implemented by computer executable codes or instructions, which collectively forms the discovery application 120. In certain embodiments, each of the modules may further include sub-modules. Alternatively, some of the modules may be combined as one single module.

The discovery module 122 is configured to perform the discovery operations. In certain embodiments, the discovery module 122 may be scheduled to perform the discovery operations periodically according to a predetermined schedule. Alternatively, the discovery module 122 may perform a discovery operation according a received instruction. Specifically, in the discovery operation, the discovery module 122 is configured to send a request message to all the network devices 150 in the network 130 via the network interface. After receiving the request message and in response to the request message, the network devices 150 may then send a feedback message to the discovery module 122, such that a communication channel is constructed between the network devices 150 and the discovery module 122. The feedback message may include identification information and status of the corresponding network device 150, and those information may then be stored in the data store 126 of the application 122. In certain embodiments, the discovery module 122 may also passively receive a message sent by the network devices 150, and retrieve and store information and status of the network devices 150 in the data store 126. In certain embodiments, the discovery module 122 discovers certain network devices, according to a discovery table stored in the data store 126, where the discovery table include identification information corresponding to the network devices 150 to be discovered.

The processing module 124 is configured to convert an address to a long integer, convert a long integer to an address, identify inclusions and overlaps in the long integers, and remove inclusions and overlaps from the long integers to generate non-redundant long integers. As discussed above, each of the network devices 150 may be identifiable by an address, such as an IP address. When the addresses of the network devices are IP addresses, the length of each IP address is large, and the space of the storage device 116 needed to store all the IP addresses are large. In certain embodiments, the IP addresses may be converted to long integers to improve efficiency of the discovery operation so that the discovery process has less traffic. On one hand, the long integers occupy less space of the storage device 116 than the IP addresses, and is easy to locate inclusion and overlaps in the long integers using for example SQL queries. On the other hand, the non-redundant long integers do not include any repeat long integers, each network device needs to be discovered is discovered once, and thus the discovery of one device two or more times is avoided, which improves efficiency of the discovery process.

Each IP address or IP address ranges may be represented by a start long integer and an end long integer. For example, for a subnet mask, the first IP address may be converted to a long integer such as 2886754305, and the last IP address may be converted to a long integer such as 2886754559. The IP range then can be represented by the two long integers 2886754305 and 2886754559, which are named start IP and the end IP. Further, for an IP range with certain number of continuous IP addresses, the first IP address may be converted to a long integer such as 2886755329, and the last IP address may be converted to a long integer such as 2886755448. The IP range then can be represented by the two long integers 2886755329 and 2886755448, which are named start IP and the end IP. Furthermore, for a single IP address, which may be converted to a long integer 2886754942, the single IP address then can be represented by two long integers having the same value of 2886754942, which are named as both the start IP and the end IP. When all those long integers representing the subnet mask, the IP range, and the single IP address are required for network discovery, combined, and are stored in the data store, the network devices corresponding to those IP addresses can then be represented by the 6 long integers, which are 2886754305 and 2886754559; 2886755329 and 2886755448; and 2886754942 and 2886754942. In certain embodiments, the processing module 124 may combine or cite a java function, a PHP function, or other related functions that is able to perform the converting from an address to a long integer, and from a long integer to an address.

Further, when a discovery table having the above non-redundant long integers are generated, and a new set of IP addresses need to be discovered are instructed by for example an administrator, the processing module 124 will convert those IP addresses to long integers, identify inclusions and overlaps between the newly converted long integers and the stored non-redundant long integers, and merge those new converted long integers into the non-redundant long integers by removing possible inclusions and overlaps, so that the long integers stored in the data store 126 are still non-redundant, that is, do not include any repeats.

The data store 126 is configure to store non-redundant long integers converted and processed by the processing module 124 as described above. In certain embodiments, the data store 126 may include the discovery table to store those long integer pairs. Each of the long integer pairs includes a start long integer and an end long integer, which correspond to a start and an end of a range of addresses. In those discovery table, as example above, the long integers may be presented as long integer pairs. For example, the long integer pair of 2886754305 and 2886754559 represents 255 IP addresses of a subnet mask, the long integer pair of 2886755329 and 2886755448 represents 120 continuous IP addresses, and the long integer pair of 2886754942 and 2886754942 represents one IP address. When one or more newly converted long integers are added, inclusions and overlaps are identified and removed, such that the discovery table do not include any repeats.

In certain embodiments, the data store 126 further includes a device table, where the discovered network devices 150 and corresponding status of the discovered network devices 150 are stored.

In certain aspects, the present disclosure relates to a method of discovering network devices by the computing device. In certain embodiments, the method may be implemented by a system as shown in FIG. 1. Specifically, the discovery application 120 may perform discovery of the network devices 150 for the computing device 110. As described above, each of the network devices is identifiable by an address. Here, IP addresses are used as examples of the addresses. In an exemplary process of discovering network devices 150, firstly, the computing device 110 receive a plurality of addresses, for example from another computing device, an administrator locally or remotely, or a user. Those received IP addresses may include different discovery configurations. In certain embodiments, the discovery configurations may include:

Type 1: an IP range with a start IP and an end IP;
Type 2: a single IP address; and
Type 3: a subnet mask such as xx.xx.xx.xx/mask.

It is noted that any other types of discovery configuration may be incorporated in this disclosure and processed similarly as the above described three types of discovery configurations.

The received discovery configurations are then converted by the processing module 124 to long integers, and after identifying possible inclusions and overlaps, stored in the data store 126. The following Table 1 is an example of the discovery table stored in the data store 126. The Table 1 may be created according to the following format and procedures:

```
(cfg_id SERIAL       PRIMARY KEY
 disc_type TEXT      NOT NULL
 start_ip BIGINT     NOT NULL
 end_ip BIGINT       NOT NULL
).
```

The generated Table 1 is as follows:

TABLE 1

Discovery table.

| cfg_id | disc_type | start_ip | end_ip |
|---|---|---|---|
| 1 | 3 | 2886754305 | 2886754559 |
| 2 | 1 | 2886755329 | 2886755448 |
| 3 | 2 | 2886754942 | 2886754942 |

In this exemplary Table 1, each address or address range is recorded with a configuration id (cfg_id). The discovery type of the received address or address range is identified and recorded under (disc_type). After converting the address or address range into long integers, the long integers are recorded under long integer pairs, and each long integer pair includes a start long integer (star_ip) and an end long integer (end_ip).

Specifically, for the first record under cfg_id 1, a range of IP addresses of a subnet mask is received by the computing device. The IP address may be received by the computing device 110 from another computing device via the network, from a device such as a USB storage directly connected to the computing device 110, or from an administrator or user entered locally or remotely. The received IP address may be, for example, 172.16.96.1 to 172.16.96.255, which belongs to Type 3 of the discovery configuration. Accordingly, the disc_type 3 is stored in the discovery table. The start IP address of 172.16.96.1 and the end IP address of 172.16.96.255 are respectively converted to long integers of 2886754305 and 2886754559 by the processing module 124. The two long integers are stored under start_ip and end_ip in the discovery table. Therefore, the 255 IP addresses can be represented by only two long integers of 2886754305 and 2886754559.

For the second record under cfg_id 2, a range of IP addresses is received by the computing device which may be a part of a subnet mask. The IP address may be received by the computing device 110 from another computing device via the network, from a device such as a USB storage directly connected to the computing device 110, or from an administrator or user entered locally or remotely. The received IP address may be, for example, 172.16.97.1 to 172.16.97.64, which belongs to Type 1 of the discovery configuration. Accordingly, the disc_type 1 is stored in the discovery table. The start IP address of 172.16.97.1 and the end IP address of 172.16.97.120 are respectively converted to long integers of 2886755329 and 2886755448 by the processing module 124. The two long integers are stored under start_ip and end_ip in the discovery table. Therefore, the 120 IP addresses can be represented by only two long integers of 2886754305 and 2886754559.

For the third record under cfg_id 3, one IP addresses is received by the computing device which may be a part of a subnet mask. The IP address may be received by the computing device 110 from another computing device via the network, from a device such as a USB storage directly connected to the computing device 110, or from an administrator or user entered locally or remotely. The received IP address may be, for example, 172.16.102.2, which belongs to Type 2 of the discovery configuration. Accordingly, the disc_type 2 is stored in the discovery table. The IP address of 172.16.102.2 is converted to long integer 2886754942 by the processing module 124. The long integer is stored under both start_ip and end_ip in the discovery table. Therefore, the one IP address can be represented by the long integer 2886754942 stored as both the start_ip and the end_ip.

The long integers may be analyzed for inclusions or overlaps before or after being stored in the data store 126. In certain embodiments, after the addresses received by the computing device are converted to long integers or long integer pairs, those long integers are analyzed to identify inclusions and/or overlaps. The identified inclusions and/or overlaps are removed, and the obtained long integer pairs are then stored in the discovery table. For example, a plurality of addresses received by the computing device 110 are converted to integer pairs of 2886754305 and 2886755559;
2886754942 and 2886754942;
2886755329 and 2886755448;
2886755402 and 2886755502.

The long integer pair 2886754942 and 2886754942 is a inclusion of the long integer pair 2886754305 and 2886755559, and the long integer pair 2886755329 and 2886755448 has overlap with the long integer pair 2886755402 and 2886755502. After removing the inclusion and the overlaps, the long integer pairs are simplified as:

2886754305 and 2886755559; and 2886755329 and 2886755502.

The above two pairs of integers are then stored in the discovery table for later use.

Further, the discovery table may also be updated after receiving additional addresses by the computing device 110. For example, the current discovery table has the long integer pairs of 2886754305 and 2886755559; and 2886755329 and 2886755502. Then the computing device 110 receives a plurality of new addresses, which are converted into integer pairs, for example: 2886756329 and 2886756502. Then the new converted long integers are stored in the discovery table and the updated discovery table thus includes the long integer pairs of:

2886754305 and 2886755559;

2886755329 and 2886755502; and 2886756329 and 2886756502.

Furthermore, the discovery table may also be updated after receiving further addresses by the computing device 110, and perform inclusion and/or overlap analysis. For example, the current discovery table has the long integer pairs of 2886754305 and 2886755559; and 2886755329 and 2886755502. Then the computing device 110 receives a plurality of new addresses, which are converted into long integer pairs, for example, of 2886756329 and 2886756502, 2886756429 and 2886756552, 2886755479 and 2886755597, and 2886754405 and 2886755510. Those new converted long integers and the long integers in the current discovery table are analyzed for inclusions and/or overlaps, and after removing the inclusions and/or overlaps, the simplified long integer pairs are stored in the discovery table. The updated discovery table thus includes the long integer pairs of:

2886754305 and 2886755559;

2886755329 and 288675559702; and 2886756329 and 2886756552.

When the discovery table is available, a discovery operation may be performed by the discovery module 122 according to the discovery table stored in the data store 126. The discovery operation may be performed periodically by the computing device 110 according to a predetermined frequency. In certain embodiments, the discovery operation may also be performed when receive a request from another computing device, from an administrator, or a user.

During the discovery operation, the discovery module 122 first retrieves the non-redundant long integers from the discovery table. The retrieved long integers are then send to the processing module 124 for converting the long integers to addresses, such as pairs of addresses, where each pair includes a start address and an end address. The addresses converted by the processing module 124 is then sent back to the discovery module 122. The discovery module 122 in response attempts to discover the network devices 150 according to the converted addresses. For each pair of addresses, the discovery operation by the discovery module 122 includes discovery of the devices corresponding to an address starting from the start address, moving one-by-one through the addresses between the start address and the end address, and ending with the end address. Once a network device 150 is discovered, the information of the discovered network device 150 can then be stored in a device table in the data store 126.

The following Table 2 is an example of the device table stored in the data store 126. As shown in Table 2, during the discovery operation, the discovery module 122 may monitor and update the status of the network devices 150 that has been previously discovered. For example, the discovery module 122 first monitors the first device with the IP address of 172.16.96.1, which is already in the device table as a device 1, and finds that the network device 150 having that IP address is active. Then the discovery module 122 monitors the second device with the IP address of 172.16.96.2, which is already in the device table as a device 2, and finds the network device 150 having that IP address is not available. The status of those network devices 150 are then updated in the device table in the data store 126.

TABLE 2

Device table.

| Device | | Status |
|---|---|---|
| 1 | 172.16.96.1 | active |
| 2 | 172.16.96.2 | not available |

In certain embodiments, each of the network devices 150 may be present in the network 130 (i.e., within a range where the network device 150 is connectable to the computing device 110) or leave the network 130 (i.e., move out of the range such that the network device 150 is not available for connection to the computing device 110) at any time. Therefore, even if the computing device 110 has the record of one of the network devices 150, the network device 150 may not be available at all times. For example, at day time, the network device 150-1 is discovered by the computing device 110 and recorded as active. The owner of the network device 150-1 may then leave the area of the network 130 during the night, such that the computing device 110 is not able to communicate with the network device 150-1. In this case, the status of the network device 150-1 can be updated as being not available or not active.

When a new network device 150 is added, an administrator may send the IP address of the new device to the discovery application 120. The discovery application 120 converts the IP address to a long integer, and identifies if the long integer is already present in the discovery table (i.e., within the range defined by one of the long integer pairs stored in the discovery table). If the long integer is not within the range defined by any of the long integer pairs stored in the discovery table, the long integer of the new device will be added to the discovery table (if not an inclusion of or overlaps with the stored long integers), and the new device will be discovered in the following discovery process. If the long integer is already within the range defined by one of the long integer pairs stored in the discovery table, that is, the new device is already been set up in the system and discovered before, thus not a real "new" device, the discovery table will not change, and no discovery of the new device is needed at this time.

Similarly, if a large number of IP addresses are received by the computing device 110, the discovery module will convert those new IP addresses to long integers, and combine those new long integers with the non-redundant long integers stored in the discovery table by identifying and removing any possible inclusions and overlaps, so as to obtain an updated discovery table, and perform the next network device discovery process according to the updated discovery table.

Figure 2:
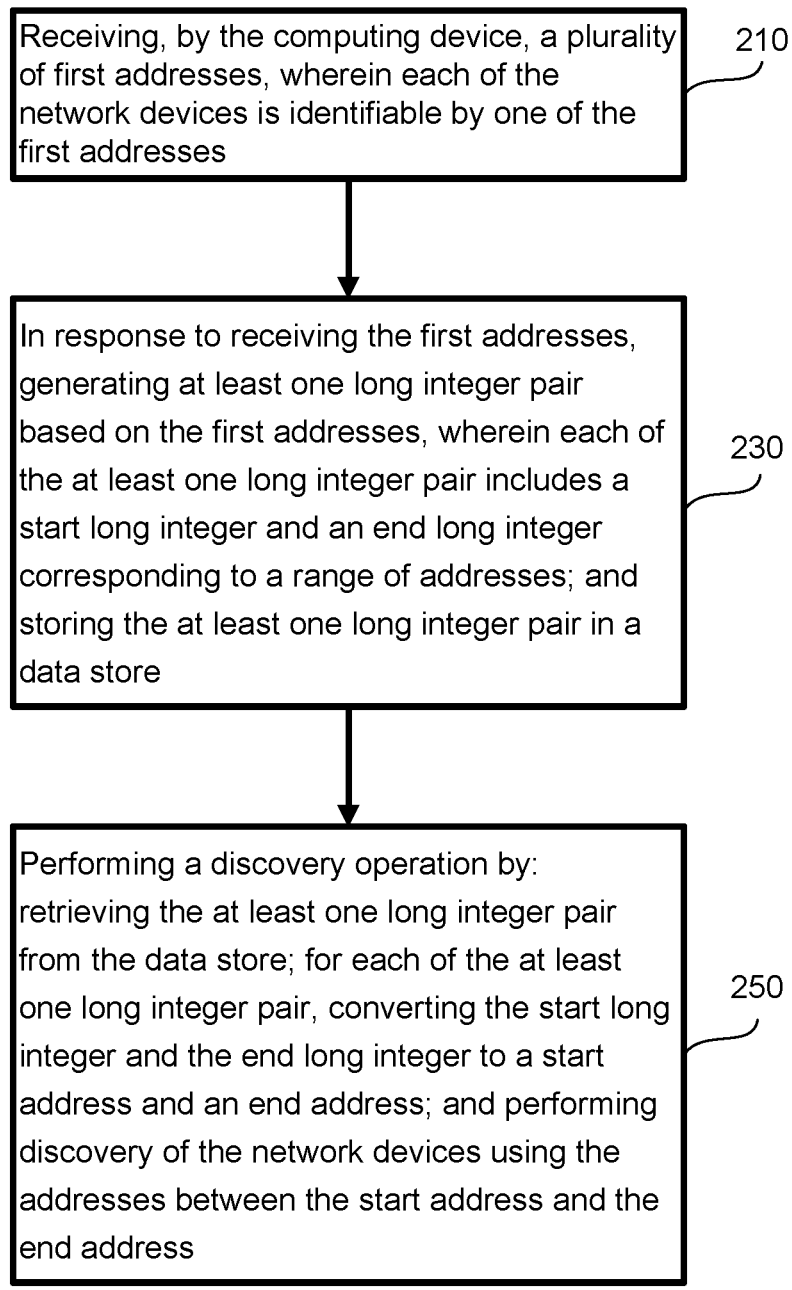
FIG. 2 depicts a flowchart of a network discovery method according to certain embodiments of the present disclosure.

In certain aspects, an efficient discovery method is provided for discovering network devices by the computing device 110. FIG. 2 depicts a flowchart of a network device discovery method according to certain embodiments of the present disclosure. As shown in FIG. 2, at operation 210, a plurality of first addresses is received by the discovery module 122 of the computing device 110. At operation 230, in response to receiving the addresses, the discovery module 122 sends the received addresses to the processing module 124, and the processing module 124 generate at least one long integer pair based on the first addresses. Each of the long integer pair has a start integer and an end integer corresponding to a range of addresses. The processing module 124 then stores the long integer pairs in the data store 126. At operation 250, the discovery module 122 of the computing device 110 performs a discovery operation. The discovery operation include: retrieving the at least one long integer pair from the data store; for each of the at least one long integer pair, converting the start long integer and the end long integer to a start address and an end address; and performing discovery of the network devices using the addresses between the start address and the end address.

Figure 3:
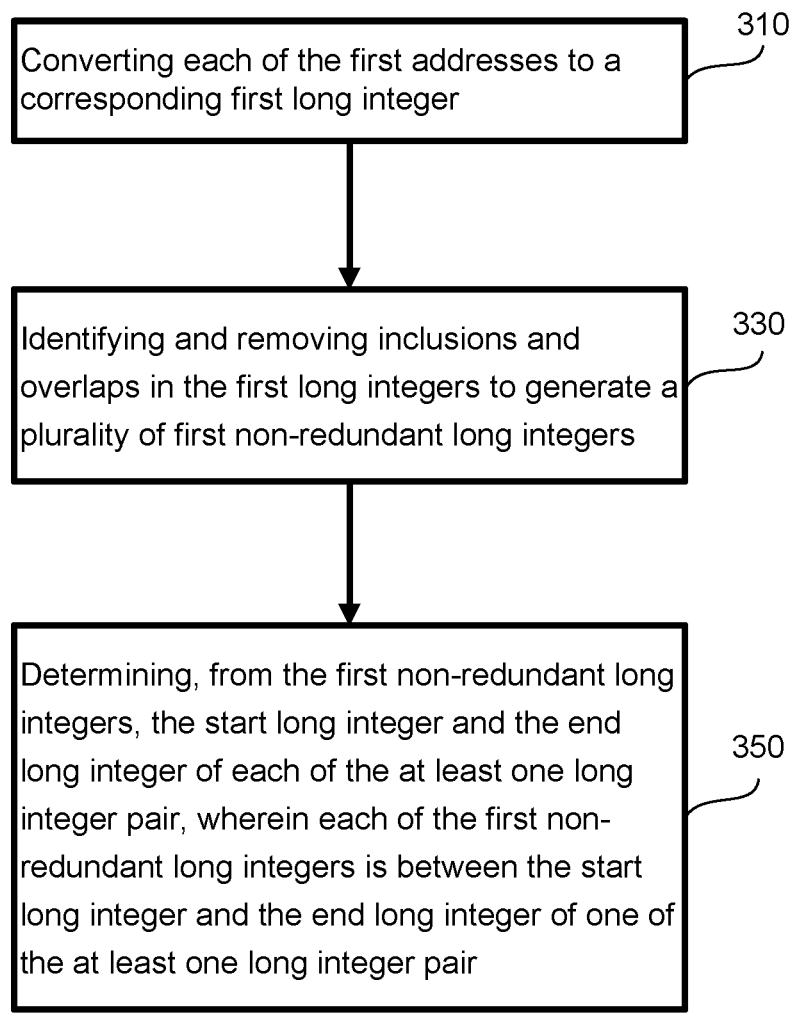
FIG. 3 depicts a flowchart of a network discovery method according to certain embodiments of the present disclosure.

In certain embodiments, as shown in FIG. 3, the step of generating the at least one long integer pair based on the first addresses includes the operations 310, 330, and 350. At operation 310, after receiving the first addresses from the discovery module 122, the processing module 124 converts each of the first addresses to a corresponding first long integer. Then at operation 330, the processing module 124 identifies if inclusions and overlaps present in the first long integers, remove the inclusions and the overlaps if present, so as to generate a plurality of first non-redundant long integers. After obtain those first non-redundant long integers, the processing module 124 further determines from those first non-redundant long integers, the start long integer and the end long integer of each of the at least one long integer pair. Each of the first non-redundant long integers is between the start long integer and the end long integer of one of the at least one long integer pair.

Figure 4:
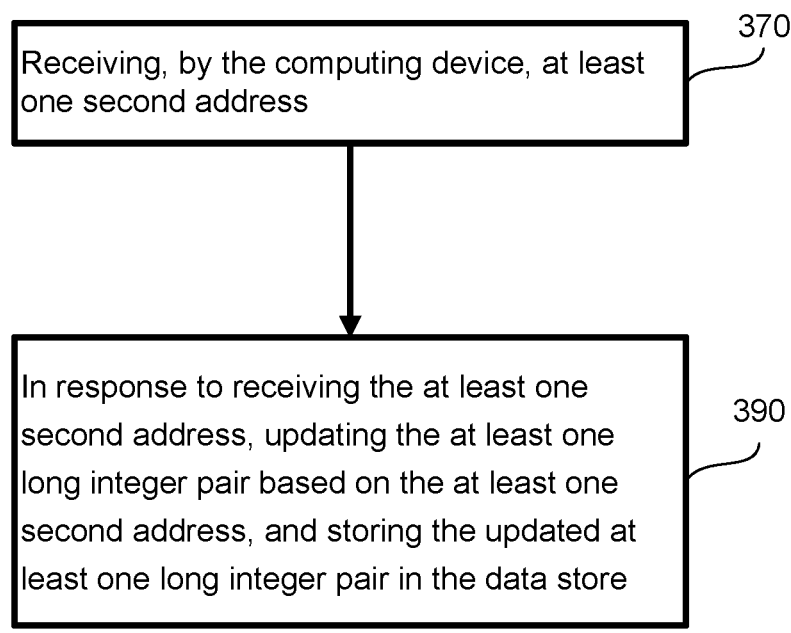
FIG. 4 depicts a flowchart of a network discovery method according to certain embodiments of the present disclosure.

In certain embodiments, when the computing device 110 receives another set of addresses, the computing devices 110 performs similar procedures as describe above. FIG. 4 depicts a flowchart of a network device discovery method according to certain embodiments of the present disclosure. As shown in FIG. 4, at operation 370, the discovery module 122 of the computing device 110 receives at least one second address, and sends the at least one second address to the processing module 124. Upon receiving the at least one second address, at operation 390 the processing module 124 updates the at least one integer pair based on the at least one second address, and storing the updated at least one long integer in the data store 126. The operations 370 and 390 can be performed many times. In other words, the discovery application 120 may update the at least on integer pair whenever one or more new addresses are received, from for example an administrator.

Figure 5:
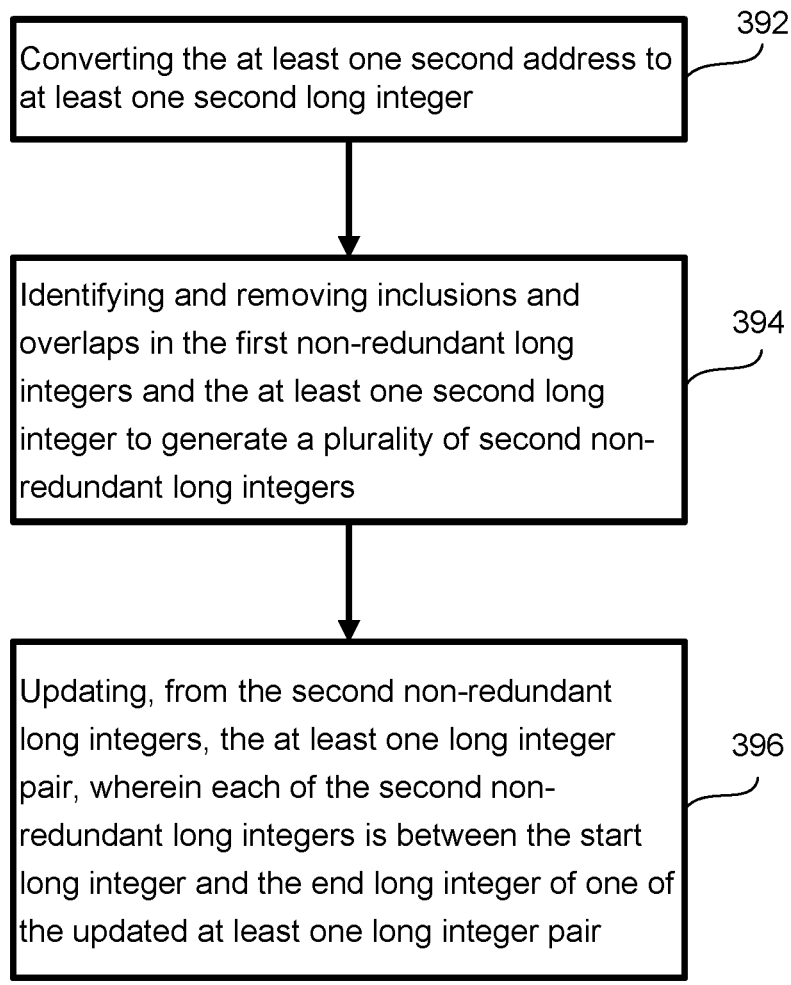
FIG. 5 depicts a flowchart of a network discovery method according to certain embodiments of the present disclosure.

Specifically, as shown in FIG. 5, the operation 390, that is, the operation of updates the at least one integer pair based on the at least one second address, includes the operations 392, 394 and 396. At operation 392, the processing module 124 converts the at least one second address to at least one second long integer. Then, at operation 394, the processing module 124 identifies and removes inclusions and overlaps in the first non-redundant long integers and the at least one second long integer to generate a plurality of second non-redundant long integers. In other words, the at least one second long integers that is already present in the first non-redundant long integers will be removed to avoid repeats. After that, at operation 396, the processing module 124 updates, from the second non-redundant long integers, the at least one long integer pair, where each of the second non-redundant long integers is between the start long integer and the end long integer of one of the updated at least one long integer pair. The updated long integer pairs are stored in the data store 126. With the updated discovery table presents in the data store 126, a discovery operation can then be performed based the updated long integer pairs in the discovery table. The operations of 392-396 may be performed whenever one or more new addresses are received, from for example an administrator. However, if the long integers corresponding to the one or more new addresses have already been included in the long integer pairs stored in the discovery table, there is no need to apply operation 396. That is, the discovery table may not need to be updated.

In another aspect, the present disclosure relates to a non-transitory computer readable medium storing computer executable code. In certain embodiments, the computer executable code may be the discovery application stored in the storage device 116 as described above. The computer executable code, when being executed, may perform one of a method described above. In certain embodiments, the non-transitory computer readable medium may include, but not limited to, the storage device 116 of the computing device 110 as described above, or any other storage media of the computing device 150.

According to certain embodiments, since each of the long integers only occupies 32 bits of the storage space, a total storage space occupied by the long integer pairs will be significantly reduced from the storage space occupied by a list of IP addresses. Thus, the storage of the network discovery information may become more efficient, and less traffic is required during the discovery process.

Further, inclusions and overlaps in the long integers is easily identified by such as SQL queries, and removed from the long integers to form non-redundant long integers. Thus, the discovery process will not discover one device two or more times, so as to improve efficiency of network device discovery, and saves resources of the computing device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A system, comprising:
a computing device communicatively connectable with a plurality of network devices via a network, the computing device comprising a processor and a storage device storing computer executable code, wherein the computer executable code, when executed at the processor, is configured to
receive, by the computing device, a plurality of first addresses, wherein each of the network devices is identifiable by one of the first addresses;
in response to receiving the first addresses, generate at least one long integer pair based on the first addresses, wherein each of the at least one long integer pair comprises a start long integer and an end long integer corresponding to a range of addresses; and store the at least one long integer pair in a data store; and perform a discovery operation by:
retrieving the at least one long integer pair from the data store;
for each of the at least one long integer pair, converting the start long integer and the end long integer to a start address and an end address; and
performing discovery of the network devices using the addresses between the start address and the end address.

2. The system of claim 1, wherein the computer executable code, when executed at the processor, is configured to generate the at least one long integer pair based on the first addresses by:
converting each of the first addresses to a corresponding first long integer;
identifying and removing inclusions and overlaps in the first long integers to generate a plurality of first non-redundant long integers; and
determining, from the first non-redundant long integers, the start long integer and the end long integer of each of the at least one long integer pair, wherein each of the first non-redundant long integers is between the start long integer and the end long integer of one of the at least one long integer pair.

3. The system of claim 2, wherein the inclusions and overlaps are identified by structured query language (SQL) queries.

4. The system of claim 1, wherein the computer executable code, when executed at the processor, is further configured to:
receive, by the computing device, at least one second address; and
in response to receiving the at least one second address,
update the at least one long integer pair based on the at least one second address, and
store the updated at least one long integer pair in the data store.

5. The system of claim 4, wherein the computer executable code, when executed at the processor, is configured to update the at least one long integer pair based on the at least one second address by:
converting the at least one second address to at least one second long integer;
identifying and removing inclusions and overlaps in the first non-redundant long integers and the at least one second long integer to generate a plurality of second non-redundant long integers; and
updating, from the second non-redundant long integers, the at least one long integer pair, wherein each of the second non-redundant long integers is between the start long integer and the end long integer of one of the updated at least one long integer pair.

6. The system of claim 1, wherein the first addresses comprises an internet protocol (IP) address, a range of IP addresses, or a subnet mask of IP addresses.

7. The system of claim 1, wherein the data store comprises a discovery table for storing the start long integer and the end long integer of each of the at least one long integer pair.

8. The system of claim 7, wherein the data store further comprises a device table recording information and status of the network devices being discovered in the discovery operation.

9. The system of claim 1, wherein the discovery operation is performed periodically.

10. The system of claim 1, wherein the discovery operation is performed according to a command received by the computing device.

11. A method of performing discovery of a plurality of network devices, comprising:
receiving, by a computing device, a plurality of first addresses, wherein the computing device comprises a processor and a storage device storing computer executable code, and communicatively connectable with the network devices via a network, and each of the network devices is identifiable by one of the first addresses;
in response to receiving the first addresses,
generating at least one long integer pair based on the first addresses, wherein each of the at least one long integer pair comprises a start long integer and an end long integer corresponding to a range of addresses; and
storing the at least one long integer pair in a data store; and
performing a discovery operation by:
retrieving the at least one long integer pair from the data store;
for each of the at least one long integer pair, converting the start long integer and the end long integer to a start address and an end address; and
performing discovery of the network devices using the addresses between the start address and the end address.

12. The method of claim 11, wherein the step of generating the at least one long integer pair based on the first addresses comprises:
converting each of the first addresses to a corresponding first long integer;
identifying and removing inclusions and overlaps in the first long integers to generate a plurality of first non-redundant long integers; and
determining, from the first non-redundant long integers, the start long integer and the end long integer of each of the at least one long integer pair, wherein each of the first non-redundant long integers is between the start long integer and the end long integer of one of the at least one long integer pair.

13. The method of claim 12, wherein the inclusions and the overlaps are identified by structured query language (SQL) queries.

14. The method of claim 12, further comprising:
receiving, by the computing device, at least one second address; and
in response to receiving the at least one second address,
updating the at least one long integer pair based on the at least one second address, and
store the updated at least one long integer pair in the data store.

15. The method of claim 14, where the steps of updating the at least one long integer pair based on the at least one second address comprises:
converting the at least one second address to at least one second long integer;
identifying and removing inclusions and overlaps in the first non-redundant long integers and the at least one second long integer to generate a plurality of second non-redundant long integers; and updating, from the second non-redundant long integers, the at least one long integer pair, wherein each of the second non-redundant long integers is between the start long integer and the end long integer of one of the updated at least one long integer pair.

16. A non-transitory computer readable medium storing computer executable code, wherein the computer executable code, when executed at a processor of a computing device, is configured to:

receive a plurality of first addresses, wherein each of a plurality of network devices is identifiable by one of the first addresses and communicatively connectable with the computing device via a network;

in response to receiving the first addresses,
generate at least one long integer pair based on the first addresses, wherein each of the at least one long integer pair comprises a start long integer and an end long integer corresponding to a range of addresses; and store the at least one long integer pair in a data store; and perform a discovery operation by:
retrieving the at least one long integer pair from the data store;

for each of the at least one long integer pair, converting the start long integer and the end long integer to a start address and an end address; and performing discovery of the network devices using the addresses between the start address and the end address.

17. The non-transitory computer readable medium of claim 16, wherein the step of generate at least one long integer pair based on the first addresses comprises:

converting each of the first addresses to a corresponding first long integer;

identifying and removing inclusions and overlaps in the first long integers to generate a plurality of first non-redundant long integers; and determining, from the first non-redundant long integers, the start long integer and the end long integer of each of the at least one long integer pair, wherein each of the first non-redundant long integers is between the start long integer and the end long integer of one of the at least one long integer pair.

18. The non-transitory computer readable medium of claim 17, wherein the inclusions and the overlaps are identified by structured query language (SQL) queries.

19. The non-transitory computer readable medium of claim 17, wherein the computer executable code, when executed at a processor of a computing device, is further configured to:

receive at least one second address; and in response to receiving the at least one second address,
update the at least one long integer pair based on the at least one second address, and store the updated at least one long integer pair in the data store.

20. The non-transitory computer readable medium of claim 19, wherein the step of update the at least one long integer pair based on the at least one second address comprises:

converting the at least one second address to at least one second long integer;

identifying and removing inclusions and overlaps in the first non-redundant long integers and the at least one second long integer to generate a plurality of second non-redundant long integers; and updating, from the second non-redundant long integers, the at least one long integer pair, wherein each of the second non-redundant long integers is between the start long integer and the end long integer of one of the updated at least one long integer pair.

* * * * *